United States Patent Office 3,303,147
Patented Feb. 7, 1967

3,303,147
DRY POWDER FOR WALLBOARD JOINT TREATMENT
Howard S. Elden, Clarence Center, N.Y., assignor to National Gypsum Company, Buffalo, N.Y., a corporation of Delaware
No Drawing. Filed Jan. 15, 1963, Ser. No. 251,483
8 Claims. (Cl. 260—8)

This invention relates to a dry powder composition suitable, by admixture of water thereto, for adhering and concealing a joint tape over the joints of gypsum wallboard, in the well known dry wall type of construction.

The use of dry powder compositions, admixed with water, for adhering and concealing joint tape over the joints of wallboard, thereby concealing the joints and producing a generally monolithic appearance, is a well-accepted, common practice. These compositions have most commonly consisted basically of a casein or soya protein binder system. A well-known problem existent in prior joint treatment compositions is the need for the application of three or four separate applications of the compositions with a delay of at least a day after each application before subsequent work could proceed whereby the complete operation of joint treatment could involve from four days to a week or more. This problem basically results from two factors, the need for permitting the joint composition to dry and set for at least about 24 hours before further work can be done without damage to the previous completed work, and, second, the fact that the shrinkage during drying and setting of prior art compositions was in the order of 20%, whereby three or four successive relatively thin coats, or applications, were required to obtain the desired ultimate smooth and flat finished surface.

It is a primary object of the present invention to provide an improved joint treatment composition which will provide a quality of a completed joint equal or superior to prior joints with substantially less labor and with substantially less time required between consecutive steps.

It is a further object of the invention to provide a joint treatment composition having a shrinkage of only about 5% during drying and hardening.

It is a still further object of the invention to provide an improved joint treatment composition which dries and hardens sufficient for subsequent treatment thereover in about two hours, even when applied in thicknesses requiring only two coat applications.

The preferred embodiment of the present invention is set forth in the following Example I:

EXAMPLE I

| | Parts by weight |
|---|---|
| $CaSO_4 \cdot \frac{1}{2} H_2O$ (100% minus 100 mesh) | 1000 |
| Emulsifiable polyvinyl acetate powder | 80 |
| Cold water soluble polyvinyl alcohol | 15 |
| Bone glue | 3 |
| Potassium sulfate | 5 |
| Polyoxyethylenearyl ether | 10 |
| Hydroxyethyl cellulose | 7 |
| Phenyl mercuric acetate | 1 |
| Alkylaryl sulfonate | 1 |
| Limestone (100% minus 100 mesh) | 500 |
| Bentonite clay (100% minus 100 mesh) | 15 |
| Mica (grade P–80) | 150 |
| Asbestos (grade 7TF) | 100 |
| | 1887 |

Binders

The essential binders of the invention are the ultrafine moulding plaster, referred to above as $CaSO_4 \cdot \frac{1}{2} H_2O$, the emulsifiable polyvinyl acetate and the cold water soluble polyvinyl alcohol.

The ultrafine moulding plaster provides a settable binder, which hydrates to form $CaSO_4 \cdot 2H_2O$, with a shrinkage of only about 5%. The lesser shrinkage of the composition of the invention in comparison to prior casein based joint treatment compositions will be seen to be provided in part by the fact that a substantial portion of the water reacts and combines in the novel composition whereas in the casein type compounds, all of the water added had to be dried off after application of the composition to the wallboard joints. This fact is also a basic contributing factor to the improved lessening of the time delay after application on a wall to the time when further work can proceed on the wall. For example, application of the second coat of the composition can be done about two hours after the first coat is applied.

The polyvinyl acetate emulsifiable powder is available as VINAC RP 251, or as GELVA 702.

A polyvinyl alcohol which is 85% hydrolyzed has the desirable cold water solubility.

Bone glue, or other equivalent animal glues, added primarily to function as a retarder for the setting of the plaster, also contribute binder properties, however, other known retarders for plaster, which would have no binder properties, may be substituted for the bone glue in accordance with the invention.

Potassium sulfate is added to accelerate the setting time of the plaster, and other known set accelerators may be substituted for the potassium sulfate. The combination of the above specified amounts of retarder and accelerator provide a uniform setting time of the plaster of about 2 to 2½ hours. A lesser amount of each could result in a similar average setting time, however, the uniformity of the setting time would be substantially lessened and subject to the influence of inadvertent admixtures, temperature, dirty tools, etc.

The polyoxyethylenearyl ether, available as PYCAL 94, is a plasticizer for the polyvinyl acetate, improving its adhesive characteristics other suitable pasticizers being dibutyl phthalate and tricresyl phosphate. The PYCAL 94 also acts as a dispersing agent and helps both the mixing and wet edge qualities of the product.

Thickener

As a thickening agent, hydroxyethyl cellulose is desirable and is available as Natrosol 250 HR. Also suitable as thickening agents are methyl cellulose or natural gums such as gum arabic. The thickening agents are desirable to provide body and cohesiveness to the paste-like "mud," as it is termed in the art, formed when water is added to the dry powder composition of the invention, and also to provide improved workability of the mud, particularly what is known as the wet edge working properties.

The phenyl mercuric acetate is a preservative for the hydroxyethyl cellulose. Also suitable are chlorinated phenols such as sodium pentachlorophenate.

Wetting agent

Alkylarylsulfonate, such as Darvan #1, is added as a wetting agent, or dispersing agent, for improving the mixing of the composition with water, and the ability of the resultant mud to wet the wallboard paper without producing rapid water absorption into the paper. Any suitable wetting agent may be substituted, such as tripolyphosphate or potassium polyphosphate.

Fillers

The limestone, bentonite clay, mica and asbestos are primarily fillers, each, however, contributing varying working qualities to the mud formed when water is added to the powder composition of the invention. All function in part as pigments. The bentonite clay tends to hold water and contribute to the working properties of the mud. The mica improves crack resistance. Asbestos provides a control of the amount of slip, or conversely, the pull, when trowelling the mud. The fineness of the limestone, clay and asbestos, as well as the plaster, is 100% minus 100 mesh and at least 50% minus 325 mesh. The fineness of the mica is 99% minus 100 mesh.

The relative proportions of the various fillers can be varied widely in accordance with the invention, in order to provide any desired combination of the above discussed characteristics, as will be readily understood by the artisan. Other known fillers may be desired for the various properties provided, such as silica flour, water-washed clays, or sericite micas.

Dry composition preparation

The dry ingredients of the composition of Example I are mixed by addition in any order, and mixing in any suitable mixer as, for example, a ribbon mixer, until all of the ingredients are thoroughly intermixed. Such mixing may be for 10 to 20 minutes. It is also preferable to screen hammer-mill the mixed composition, with screen openings of ¼ inch to ½ inch, to be sure all ingredients are thoroughly dispersed. The mixed dry composition may then be packaged in any suitable moisture resistant or vapor proof container.

Mud preparation and use

The dry composition of Example I may be prepared for use as a wallboard joint treatment compound by the addition and thorough mixing therewith of about 5 to 6 pounds of water per 10 pounds of dry powder. When thoroughly mixed, this mud is applied to the edge portions of the wallboard faces, adjacent a joint and a suitable reinforcing tape, such as of paper, glass fiber, cloth, etc., is embedded into the mud, over the joint.

Of the 5 to 6 pounds of water added to each of the 10 pounds of powder, about 1 pound will combine with the plaster and about 4 to 5 pounds will evaporate during drying. This compares with about 6 to 8 pounds of water used per 10 pounds of prior casein type joint compounds, all of which had to be removed by drying. Furthermore, the hydration of the plaster component of the invention results in a hardening to a set plaster in about 2 hours, permitting further work to proceed thereafter, regardless of the completeness of the drying, which was not true with prior casein-based joint compounds.

The combination of binders of the invention, when applied to wallboard joints and set and dried, provides a relatively hard but flexible, well-adhered and permanent material, which may be sanded, where necessary, to form a highly uniform surface, concealing the joint thereunder, and providing, with the balance of the wallboard surface, a high quality monolithic wall surface.

The formulation of Example I may be modified by variation of proportions of the primary critical elements of the novel formulation, as follows:

EXAMPLES II AND III

| | Parts by weight | |
|---|---|---|
| | II | III |
| $CaSO_4 \cdot \frac{1}{2}H_2O$ (100% minus 100 mesh) | 750 | 1,250 |
| Emulsifiable polyvinyl acetate powder | 80 | 80 |
| Cold water soluble polyvinyl alcohol | 15 | 15 |
| Bone Glue | 3 | 4 |
| Potassium Sulfate | 5 | 6 |
| Polyoxyethylenearyl ether | 10 | 10 |
| Hydroxylethyl cellulose | 7 | 7 |
| Phenyl mercuric acetate | 1 | 1 |
| Alkylaryl sulfonate | 1 | 1 |
| Limestone (100% minus 100 mesh) | 750 | 250 |
| Bentonite clay (100% minus 100 mesh) | 15 | 15 |
| Mica (grade P-80) | 150 | 150 |
| Asbestos (grade 7TF) | 100 | 100 |
| | 1,887 | 1,889 |

As compared to Example I wherein the preferred percentage of plaster is shown as about 50% of the total weight, Examples II and III indicate the variability of this within a range of from about 40% to 65%. A percentage of plaster below about 40% results in the composition, when used, not hardening to a satisfactory degree. With percentages of plaster above 65%, the composition, when used, hardens excessively.

EXAMPLES IV, V AND VI

| | Parts by weight | | |
|---|---|---|---|
| | IV | V | VI |
| $CaSO_4 \cdot \frac{1}{2}H_2O$ (100% minus 100 mesh) | 1,000 | 1,000 | 1,000 |
| Emulsifiable polyvinyl acetate powder | 70 | 60 | 90 |
| Cold water soluble polyvinyl alcohol | 24 | 24 | 9 |
| Bone Glue | 3 | 3 | 3 |
| Potassium sulfate | 5 | 5 | 5 |
| Polyoxyethylenearyl ether | 10 | 10 | 10 |
| Hydroxylethyl cellulose | 7 | 7 | 7 |
| Phenyl mercuric acetate | 1 | 1 | 1 |
| Alkylaryl sulfonate | 1 | 1 | 1 |
| Limestone (100% minus 100 mesh) | 500 | 500 | 500 |
| Bentonite clay (100% minus 100 mesh) | 15 | 15 | 15 |
| Mica (grade P-80) | 150 | 150 | 150 |
| Asbestos (grade 7TF) | 100 | 100 | 100 |
| | 1,886 | 1,876 | 1,891 |

By comparison of Examples I, IV, V and VI it will be seen that the preferred ratio of the combination of polyvinyl acetate and polyvinyl alcohol to the total weight of composition remains at about 4% to 6%, however, up to 10% may be used with consequent increased cost. The ratio of polyvinyl acetate to polyvinyl alcohol will be seen to be variable from about 3:1 to 10:1 in accordance with the invention. With a combined polyvinyl acetate and polyvinyl alcohol percentage of below 4%, the resultant joint treatment has been found to be too soft, and above 10% it has been found to be too hard.

Having completed a detailed disclosure of the preferred embodiments of my invention so that those skilled in the art may practice the same, I contemplate that variations may be made without departing from the essence of the invention or the scope of the appended claims.

I claim:

1. A dry powder composition suitable on admixture of water for application over and concealing of gypsum wallboard joint areas, comprising essentially as the active binding ingredients from about 40% to 65% by weight of 100% minus 100 mesh calcined gypsum, and about 4% to 10% by weight of the combination of polyvinyl acetate emulsifiable powder and polyvinyl alcohol powder, which said polyvinyl alcohol powder is at least 85% hydrolyzed, and from about 23% to 54% by weight inert filler powders, wherein the ratio of said polyvinyl acetate powder to said polyvinyl alcohol powder is from about 3:1 to 10:1.

2. The composition of claim 1 wherein said composition further comprises proteinaceous plaster set retarder and a plaster set accelerator, said retarder and accelerator being of a relative proportion such that upon admixture of water to said composition said calcined gypsum will set in about two hours to sufficient hardness for application thereover of subsequent coats without damage to a prior coat with said set gypsum.

3. The composition of claim 2 wherein said set retarder is an animal glue in an amount of about 3 parts per thousand parts calcined gypsum.

4. The composition of claim 2 wherein said set accelerator is potassium sulfate in an amount of about 5 parts per thousand parts calcined gypsum.

5. The composition of claim 1 wherein said composition further comprises a minor portion of a thickening agent.

6. The composition of claim 1 wherein said inert fillers comprise in greatest proportion limestone powder of a fineness of 100% minus 100 mesh.

7. The composition of claim 6 wherein said inert fillers further comprise, in relatively lesser proportions, finely divided clay, mica and asbestos.

8. A dry powder composition suitable on admixture of water for application over and concealing of gypsum wallboard joint areas comprising essentially by weight 750 to 1250 parts of 100% minus 100 mesh calcined gypsum, 45 to 100 parts polyvinyl acetate emulsifiable powder, 7 to 30 parts polyvinyl alcohol powder which is at least 85% hydrolyzed, about 3 parts animal glue, about 5 parts of gypsum set accelerator, about 7 parts of a thickening agent, 250 to 750 parts limestone powder of a fineness of 100% minus 100 mesh, about 15 parts finely divided clay, about 150 parts finely divided mica, and about 100 parts finely divided asbestos.

References Cited by the Examiner
UNITED STATES PATENTS

| | | | |
|---|---|---|---|
| 2,311,233 | 2/1943 | Jaenicke et al. | 260—29.6 |
| 2,523,646 | 9/1950 | Buchanan | 106—112 |
| 2,570,827 | 10/1951 | Madison et al. | 106—194 |
| 2,733,995 | 2/1956 | Robinson | 260—29.6 |

WILLIAM H. SHORT, *Primary Examiner.*

J. NORRIS, *Assistant Examiner.*